US012741707B2

(12) United States Patent
Mizusawa

(10) Patent No.: US 12,741,707 B2
(45) Date of Patent: Sep. 22, 2026

(54) ELASTIC CRAWLER WITH CORE METAL

(71) Applicant: BRIDGESTONE CORPORATION, Tokyo (JP)

(72) Inventor: Takashi Mizusawa, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 411 days.

(21) Appl. No.: 18/481,434

(22) Filed: Oct. 5, 2023

(65) Prior Publication Data

US 2024/0124076 A1 Apr. 18, 2024

(30) Foreign Application Priority Data

Oct. 14, 2022 (JP) ................................ 2022-165800

(51) Int. Cl.
*B62D 55/253* (2006.01)

(52) U.S. Cl.
CPC ................................ *B62D 55/253* (2013.01)

(58) Field of Classification Search
CPC ............................ B62D 55/253; B62D 55/244
USPC ........................................................ 305/167
See application file for complete search history.

(56) References Cited

U.S. PATENT DOCUMENTS

2021/0354770 A1* 11/2021 Choi .................... B62D 55/244

FOREIGN PATENT DOCUMENTS

JP 3035000 B2 * 4/2000
JP 3205359 B2 * 9/2001
JP 2005212741 A * 8/2005
JP 2008265369 A * 11/2008
JP 5065741 B2 * 11/2012
JP 5657258 B2 * 1/2015
JP 2021037849 A * 3/2021 ........... B62D 55/253

OTHER PUBLICATIONS

Extended European Search Report issued Mar. 26, 2024 in Application No. 23201797.0.

* cited by examiner

*Primary Examiner* — S. Joseph Morano
*Assistant Examiner* — Eva L Comino
(74) *Attorney, Agent, or Firm* — Sughrue Mion, PLLC

(57) ABSTRACT

A construction vehicle including a crawler traveling device including a driving sprocket, rollers and an elastic crawler with core metals having a configuration in which rollers arranged along a ground roll on a top surface of a guide protrusion, roller disengagement preventing protrusions respectively protrude in opposite directions of a crawler circumferential direction from a pair of guide protrusion bases of a core metal main body; the roller disengagement preventing protrusions protruding in the crawler circumferential direction to protrude to each other toward opposed core metal main bodies of adjacent core metals mesh each other in a crawler width direction; and ribs are formed that connect the roller disengagement preventing protrusions on a side of a core metal blade part among the roller disengagement preventing protrusions meshing each other in the crawler width direction and core metal blade parts.

6 Claims, 7 Drawing Sheets

ELASTIC CRAWLER WITH CORE METAL

TECHNICAL FIELD

The present invention relates to an elastic crawler with a plurality of core metals embedded in a crawler circumferential direction in an endless belt-shaped endless belt elastic body.

BACKGROUND ART

A core metal main body elongated in a crawler width direction of a core metal includes a central portion, a pair of guide protrusion bases in which a pair of guide protrusions protruding toward a crawler inner circumference side is formed at opposite ends of the central portion, and a pair of core metal blade parts respectively extending from the pair of guide protrusion bases to opposite sides.

An elastic crawler with a core metal in which rollers arranged along the ground roll on a top surface of a guide protrusion is known, and in particular, there are examples (e.g., Patent Document 1 and the like) in which a roller disengagement preventing protrusion protrudes from a core metal main body in a crawler circumferential direction in order to prevent a roller from being disengaged due to lateral displacement between adjacent core metals in a crawler width direction.

PRIOR ART DOCUMENT

Patent Document

Patent Document 1: JP 2005-212741 A

In the elastic crawler with a core metal according to Patent Document 1 in which rollers roll on a top surface of a guide protrusion, a pair of guide protrusions protrudes toward a crawler inner circumference side in a core metal main body elongated in a crawler width direction of a core metal, and a pair of detachment preventing protrusions (roller disengagement preventing protrusions) protrudes from protrusion bases of the pair of guide protrusions in a crawler circumferential direction.

Then, the pair of detachment preventing protrusions protruding to each other toward the core metal main bodies opposed to each other of adjacent core metals mesh each other in the crawler width direction, thereby suppressing lateral displacement between the adjacent core metals in the crawler width direction.

In addition, the pair of detachment preventing protrusions protruding to each other toward the respective opposed core metal main bodies partially mesh each other also in a crawler thickness direction, so that the meshed detachment preventing protrusions suppress fluctuation with each other in the crawler thickness direction. Therefore, fluctuation (rotation) of the guide protrusions in the crawler circumferential direction is suppressed between the adjacent core metals.

SUMMARY OF THE INVENTION

Underlying Problems to be Solved by the Invention

In an elastic crawler with a core metal having a configuration in which rollers arranged along the ground roll on a top surface of a guide protrusion, the rollers roll on the top surface of the guide protrusion of the core metal from a downstream side end portion to an upstream side end portion via a center in a crawler rotation direction of the guide protrusion.

When the rollers are located at the downstream side end portion, a pressing force is applied to the downstream side end portion of the guide protrusion to press the elastic crawler against the ground, so that the guide protrusion is twisted and rotated with respect to a core metal blade part of the core metal which is kept substantially parallel to the ground, and the downstream side end portion of the guide protrusion is pushed down.

When the roller is located at the center of the guide protrusion, a pressing force is applied to the center of the guide protrusion, so that the guide protrusion does not twist and rotate and the guide protrusion is not pushed down.

When the roller reaches the upstream side end portion via the center of the guide protrusion. A pressing force is applied to the upstream side end portion of the guide protrusion, and the guide protrusion is twisted and rotated with respect to the core metal blade part to push down the upstream side end portion of the guide protrusion.

Accordingly, since in the course of rolling on the top surface of the guide protrusion of the core metal, the rollers push down the downstream side end portion at the downstream side end portion of the guide protrusion and push down the upstream side end portion at the upstream side end portion, the guide protrusion fluctuates its top portion in the crawler circumferential direction, so that the rollers themselves move up and down.

The vertical movement of the rollers causes vibration.

In the elastic crawler with a core metal according to Patent Document 1, the detachment preventing protrusions protruding to each other toward the respective opposed core metal main bodies partially mesh each other in the crawler thickness direction, so that fluctuation of the top portions of the guide protrusions are prevented in the crawler circumferential direction between the adjacent core metals.

However, when the rollers move from the guide protrusion to the adjacent guide protrusion, the rollers sometimes ride on both of the upstream side end portion and the downstream side end portion of each of both the guide protrusions. At this time, the upstream side end portion and the downstream side end portion of each of the guide protrusions are simultaneously pushed down. Therefore, even when the detachment preventing protrusions protruding to each other toward the respective opposed core metal main bodies partially mesh each other also in the crawler thickness direction, both meshed portions of the meshing detachment preventing protrusions are pushed down, so that fluctuation of the top portions of the guide protrusions in the crawler circumferential direction cannot be suppressed with each other.

Accordingly, the vertical movement of the rollers is not suppressed, and vibration is generated.

This causes also a bodywork itself to have deterioration of traveling vibration.

Note that while there is an example in which a part of one roller disengagement preventing protrusion meshes a part of the other roller disengagement preventing protrusion in a crawler thickness direction so as to sandwich the latter part therebetween, it is hard to set a clearance between meshed parts, and it is difficult to design so as not to affect curving deformation of the crawler in a normal use range.

The present invention has been made in view of such points, and an object of the present invention is to provide an elastic crawler with a core metal enabling vertical movement of a roller to be suppressed to reduce vibration by increasing torsional rigidity of a guide protrusion with respect to a core metal blade part.

Means to Solve the Problems

In order to achieve the above object, the present invention provides an elastic crawler with core metals embedded in an endless belt-shaped elastic body made of an elastic material at constant intervals in a crawler circumferential direction, the elastic crawler with core metals having a configuration in which a core metal main body elongated in a crawler width direction of the core metal includes a central engagement portion with which a driving sprocket is engaged, a pair of guide protrusion bases formed at opposite ends of the central engagement portion, and a pair of core metal blade parts extending laterally to opposite sides to each other from the pair of guide protrusion bases, a pair of guide protrusions protrudes from the pair of guide protrusion bases to a crawler inner circumference side, the core metal is embedded in the endless belt-shaped elastic body except for at least the guide protrusions, and rollers arranged along a ground roll on a top surface of the guide protrusion, wherein roller disengagement preventing protrusions respectively protrude in opposite directions of a crawler circumferential direction from the pair of guide protrusion bases of the core metal main body, the roller disengagement preventing protrusions protruding in the crawler circumferential direction to protrude to each other toward respective opposed core metal main bodies of adjacent core metals mesh each other in the crawler width direction, and ribs are formed that connect the roller disengagement preventing protrusions on a side of the core metal blade part among the roller disengagement preventing protrusions meshing each other in the crawler width direction and the core metal blade parts.

According to this configuration, since the rib connects the roller disengagement preventing protrusion protruding in the crawler circumferential direction from the guide protrusion base of the core metal main body and the core metal blade part, torsional rigidity of the guide protrusion formed in the guide protrusion base with respect to the core metal blade part is structurally enhanced, and an area of the roller disengagement preventing protrusion embedded in the elastic body when viewed from a crawler thickness direction is expanded by the rib, so that rotation of the roller disengagement preventing protrusion and the guide protrusion by the elastic body is further suppressed. Therefore, even when the roller rolls on the top surface of the guide protrusion, torsional rotation of the guide protrusions is suppressed with respect to the core metal blade part of the core metal which is kept substantially parallel to the ground by pressing of the elastic crawler against the ground, and thus, it is possible to reduce vertical movement of the roller to make vibration more difficult to occur, thereby preventing deterioration of traveling vibration of a bodywork.

In a preferred embodiment of the present invention, the rib has a crawler outer circumference side surface located at the same position as a crawler outer circumference side surface of the core metal blade part, or located on the crawler inner circumference side of the crawler outer circumference side surface.

According to this configuration, since the crawler outer circumference side surface of the rib is located at the same position as the crawler outer circumference side surface of the core metal blade part, or located on the crawler inner circumference side of the crawler outer circumference side surface, the rib is located closer to the top portion of the guide protrusion, and a rotation center of the guide protrusion with respect to the core metal blade part comes to the crawler inner circumference side, whereby the torsional rigidity of the guide protrusion with respect to the core metal blade part is enhanced. As a result, the rotation of the guide protrusion is suppressed to make the vertical movement of the roller further smaller, thereby making the vibration more difficult to occur.

In the preferred embodiment of the present invention, the rib is raised toward the crawler inner circumference side.

According to this configuration, since the rib is raised toward the crawler inner circumference side, the rotation center of the guide protrusion with respect to the core metal blade part comes to the crawler inner circumference side, whereby the torsional rigidity of the guide protrusion with respect to the core metal blade part is enhanced. As a result, the rotation of the guide protrusion is suppressed to make the vertical movement of the roller smaller, thereby making the vibration more difficult to occur.

In the preferred embodiment of the present invention, the rib sits on a steel cord layer embedded on a crawler outer circumference side of the core metal blade part of the endless belt-shaped elastic body in a crawler thickness direction.

Since the rib sits on the steel cord layer embedded on the crawler outer circumference side of the core metal blade part of the endless belt-shaped rubber body in the crawler thickness direction, the rib, together with the core metal blade part, is supported by the steel cord layer via an elastic material.

Since the rib connects the core metal blade part and the disengagement preventing protrusion, together with the rib, the guide protrusion is supported by the steel cord layer via the roller disengagement preventing protrusion and further the guide protrusion base, so that the rotation of the guide protrusion is further suppressed.

Therefore, the vertical movement of the roller can be further reduced to make the vibration more difficult to occur.

In the preferred embodiment of the present invention, the paired roller disengagement preventing protrusions protruding respectively from the pair of guide protrusion bases in opposite directions of the crawler circumferential direction have protrusion lengths different from each other.

According to this configuration, since the pair of roller disengagement preventing protrusions respectively protruding from the pair of guide protrusion bases in one crawler circumferential direction have different protrusion lengths, the protrusion length of one disengagement preventing protrusion of the pair of disengagement preventing protrusions can be increased as compared with a case where the protrusion lengths are the same, whereby resistance to the rotation of the guide protrusion increases to suppress the rotation of the guide protrusion, resulting in further reducing the vertical movement of the roller to make the vibration more difficult to occur.

In the preferred embodiment of the present invention, a difference between the protrusion lengths of the pair of roller disengagement preventing protrusions is 15% or less of an embedding pitch of the core metal.

When the difference between the protrusion lengths of the pair of roller disengagement preventing protrusions is large, the resistance of the pair of disengagement preventing protrusions to the rotation of the pair of guide protrusions greatly varies, so that the central engagement portion between the pair of guide protrusions may be twisted to cause the pair of guide protrusions to rotate in opposite directions to each other, which may cause the vertical movement of the roller.

According to this configuration, by setting the difference between the protrusion lengths of the pair of roller disengagement preventing protrusions to 15% or less of the embedding pitch of the core metal, it is possible to suppress the rotation of the pair of guide protrusions in opposite directions as much as possible while increasing the resistance of the roller disengagement preventing protrusion having the larger protrusion length to the rotation of the guide protrusion as compared with the case where the protrusion lengths are the same, thereby further reducing the vertical movement of the roller.

Effects of the Invention

In the present invention, since the rib connects the roller disengagement preventing protrusion protruding in the crawler circumferential direction from the guide protrusion base of the core metal main body and the core metal blade part, torsional rigidity of the guide protrusion formed in the guide protrusion base with respect to the core metal blade part is structurally enhanced, and an area of the roller disengagement preventing protrusion embedded in the elastic body when viewed from the crawler thickness direction is expanded by the rib, so that the rotation of the roller disengagement preventing protrusion and the guide protrusion by the elastic body is further suppressed. Therefore, even when the roller rolls on the top surface of the guide protrusion, torsional rotation of the guide protrusions is suppressed with respect to the core metal blade part of the core metal which is kept substantially parallel to the ground by pressing of the elastic crawler against the ground, and thus, it is possible to reduce the vertical movement of the roller to make vibration more difficult to occur, thereby preventing deterioration of traveling vibration of a bodywork.

MODE FOR CARRYING OUT THE INVENTION

In the following, one embodiment according to the present invention will be described with reference to FIGS. 1 to 10.

Figure 1:
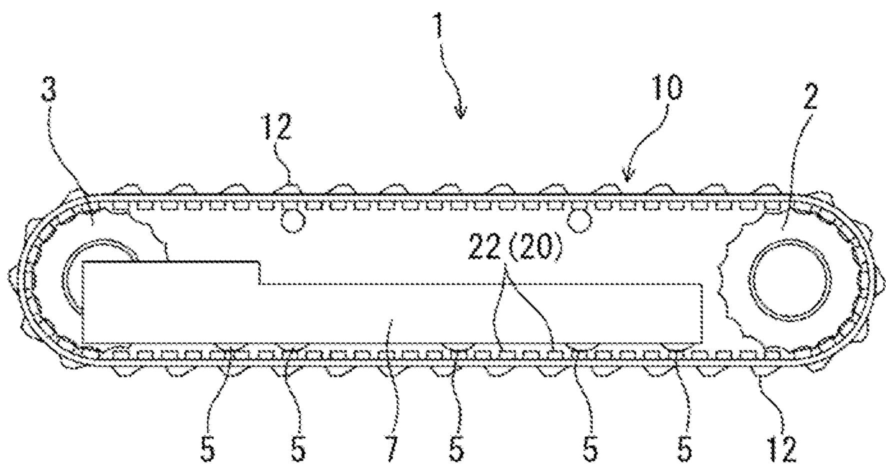
FIG. 1 is a schematic side view of a crawler traveling device using an elastic crawler with core metals according to an embodiment of the present invention.
Figure 2:
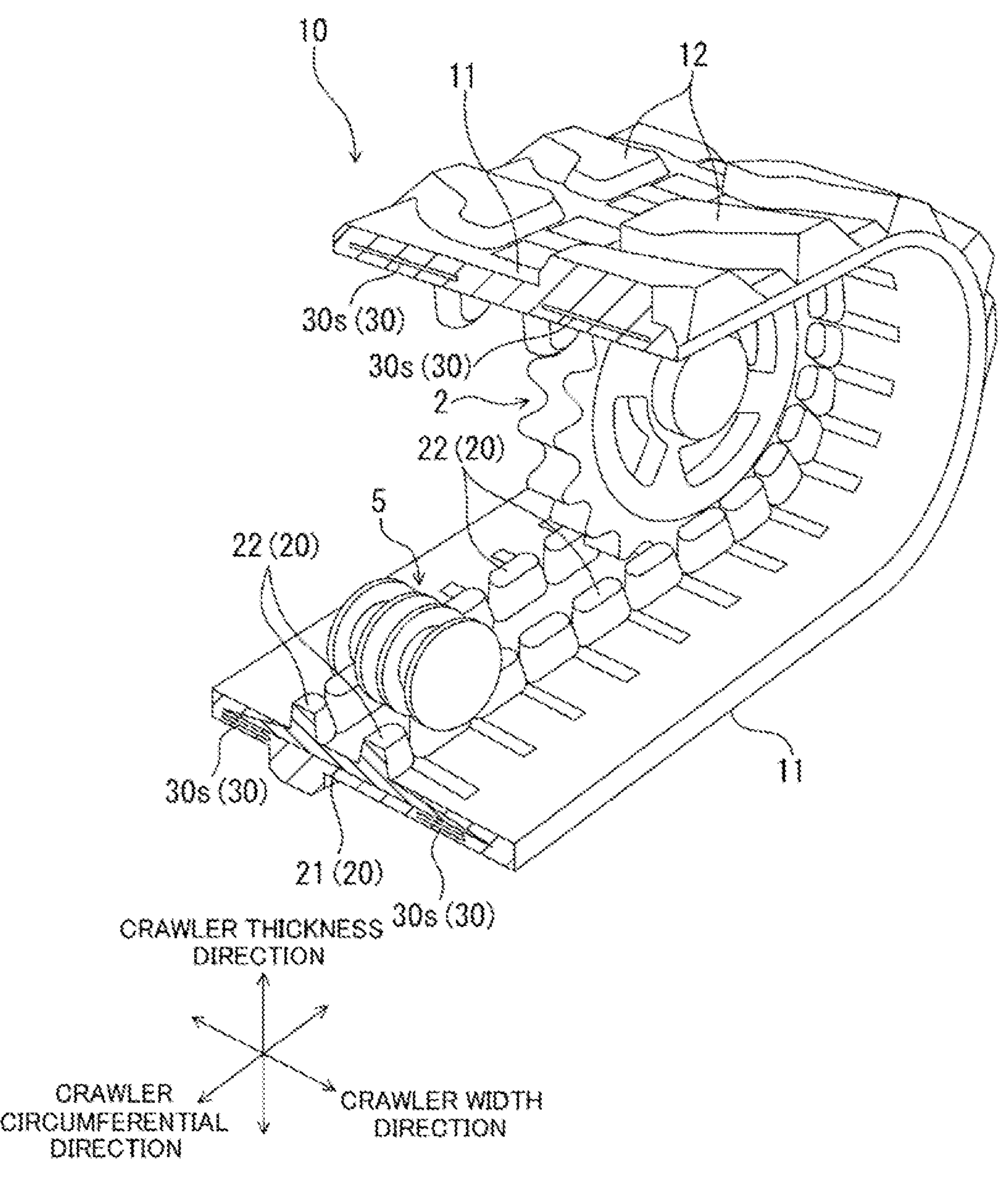
FIG. 2 is a schematic perspective view showing a part of the elastic crawler with core metals as a cross section.

FIG. 1 is a schematic side view of a crawler traveling device 1 using an elastic crawler 10 with core metals according to the embodiment of the present invention, and FIG. 2 is a schematic perspective view showing a part of the elastic crawler 10 with core metals as a cross section.

The crawler traveling device 1 is mainly mounted on a construction vehicle such as a mini excavator or a bulldozer and used as a traveling device.

In FIG. 2, a crawler circumferential direction, a crawler width direction, and a crawler thickness direction of a part of the elastic crawler 10 with core metals in contact with the ground are indicated by arrows.

In the crawler traveling device 1, a driving sprocket 2 and a driven sprocket 3 are disposed at both front and rear ends and attached to a vehicle (not illustrated), and the elastic crawler 10 with core metals configured in an endless belt shape is wound around the driving sprocket 2 and the driven sprocket 3.

In the crawler traveling device 1, the elastic crawler 10 with core metals can rotate and travel between the driving sprocket 2 and the driven sprocket 3 by rotational driving of the driving sprocket 2.

Then, in the elastic crawler 10 with core metals, a plurality of rollers 5 are arranged in a front-rear direction in a part in contact with the ground, the part bridging between the driving sprocket 2 and the driven sprocket 3.

The rollers 5 are attached to a frame 7 of the vehicle, and presses the elastic crawler 10 with core metals in contact with the ground from above.

Paired left and right crawler traveling devices 1 are attached to opposite sides of the vehicle in a vehicle width direction, respectively, and can be driven independently of each other.

In the elastic crawler 10 with core metals, a plurality of core metals 20 are embedded in an endless belt-shaped rubber body 11 made of rubber which is an elastic material formed in an endless belt shape at constant intervals in the crawler circumferential direction (a rotation direction of the elastic crawler 10 with core metals).

On an outer circumference surface of the endless belt-shaped rubber body 11 in contact with the ground, a plurality of lugs 12 are formed to protrude at constant intervals in the crawler circumferential direction, and on an inner circumference surface of the endless belt-shaped rubber body 11, a part (a guide protrusion and the like to be described later) of the plurality of core metals 20 embedded at constant intervals in the crawler circumferential direction is exposed.

FIG. 2 is a perspective view showing a part of the present elastic crawler with core metals as a cross section, and with reference to FIG. 2, the individual lugs 12 protrude in a substantially trapezoidal shape, extend obliquely from the center to both sides in the crawler width direction of the outer circumference surface of the crawler main body 11, and are arranged in the plural in the crawler circumferential direction.

The core metal 20 embedded in the endless belt-shaped rubber body 11 has a shape illustrated in FIGS. 3 to 7.

A rectangular plate-shaped core metal main body 21 elongated in the crawler width direction of the core metal 20 includes a central engagement portion 21*a* with which the driving sprocket 2 engages, a pair of guide protrusion bases 21*b* and 21*b* formed at the opposite ends of the central engagement portion 21*a*, and a pair of core metal blade parts 21*c* and 21*c* extending from the pair of guide protrusion bases 21*b* and 21*b* to opposite sides to each other.

A pair of guide protrusions 22 and 22 protrudes from the pair of guide protrusion bases 21*b* and 21*b* toward a crawler inner circumference side in the crawler thickness direction.

The guide protrusion 22 is a rectangular columnar body having a width in the crawler circumferential direction longer than a width in the crawler width direction, and has a top surface 22*f* which is substantially flat and has a center slightly recessed in the crawler circumferential direction.

Such guide protrusions 22 are formed in pair to face each other in the crawler width direction.

The central engagement portion 21*a* is provided between the pair of guide protrusions 22 and 22.

Figure 3:
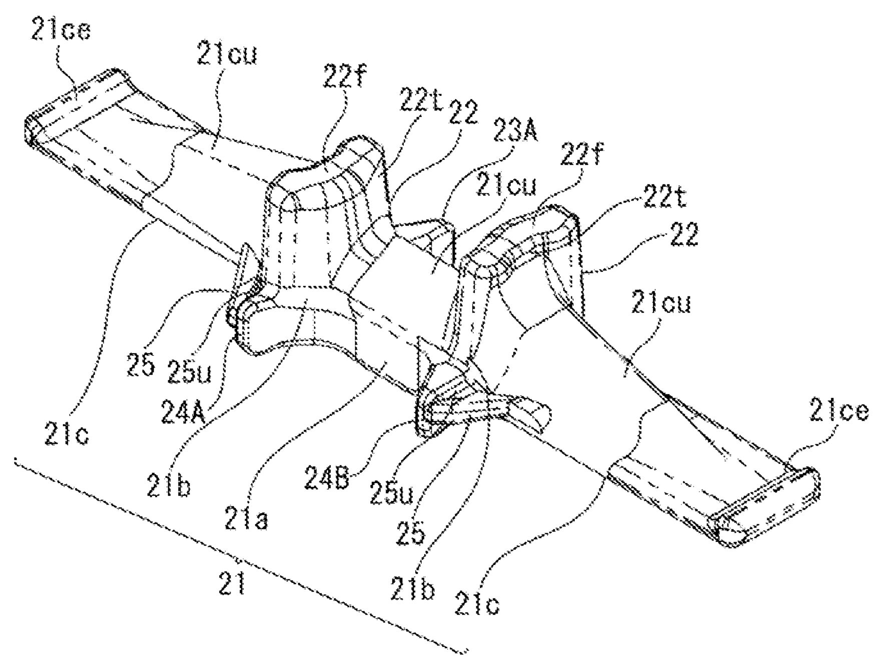
FIG. 3 is a perspective view of the core metal.
Figure 4:
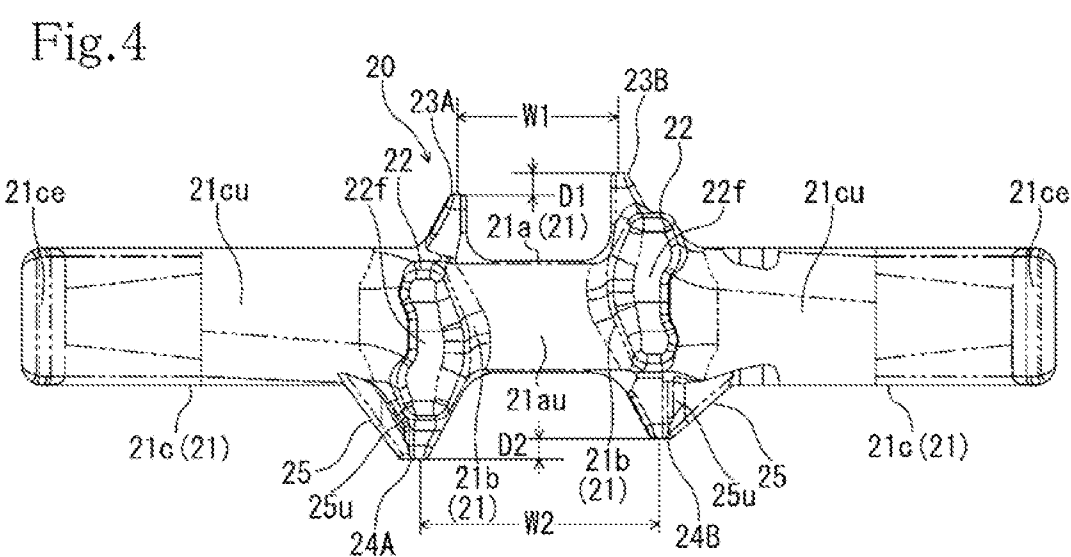
FIG. 4 is a view of the core metal as viewed from a crawler inner circumference side.

With reference to FIGS. 3 and 4, the paired guide protrusions 22 and 22 are slightly shifted from each other in the crawler circumferential direction.

The pair of core metal blade parts 21*c* and 21*c* extending laterally to opposite sides to each other from the pair of guide protrusion bases 21*b* and 21*b* have: crawler outer circumference side surfaces 21*cd* and 21*cd* forming substantially flat surfaces; crawler inner circumference side surfaces 21*cu* and 21*cu* having outer end portions forming ridge portions 21*ce* and 21*ce*; and a central portion in the crawler circumferential direction gradually rising from the ridge portions 21*ce* and 21*ce* at the outer end portions toward the guide protrusions 22 and 22.

The central engagement portion 21*a* has a crawler inner circumference side surface 21*au* forming a bottom surface of a recessed portion formed between the pair of guide protrusions 22 and 22, and a crawler outer circumference side surface 21*ad* bulging more toward a crawler outer circumference side than the substantially flat crawler outer circumference side surfaces 21*cd* and 21*cd* of the core metal blade parts 21*c* and 21*c* on opposite sides.

From the pair of guide protrusion bases 21*b* and 21*b* of the core metal main body 21, a pair of roller disengagement preventing protrusions 23A and 23B protrudes in one direction of the crawler circumferential direction, and a pair of roller disengagement preventing protrusions 24A and 24B protrudes in the other direction of the crawler circumferential direction.

Figure 5:
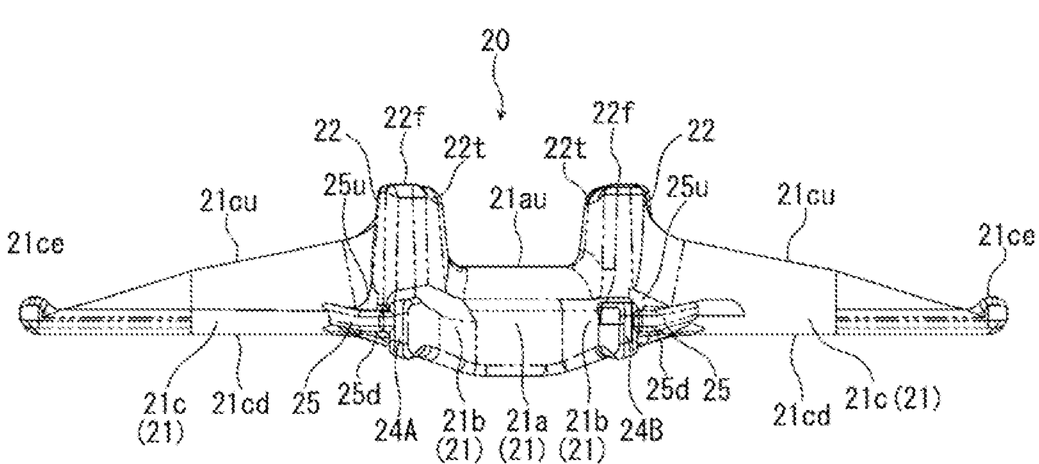
FIG. 5 is a front view of the core metal.
Figure 6:
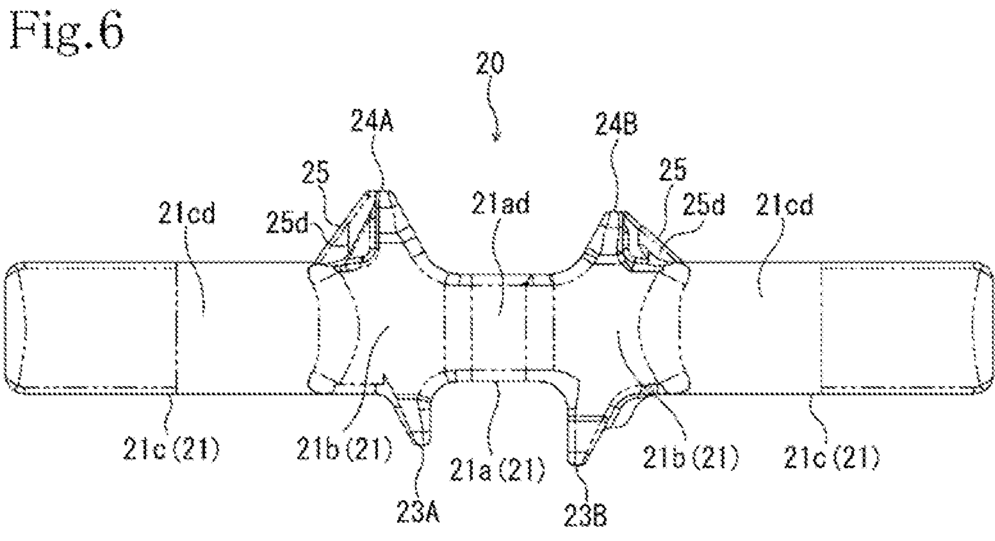
FIG. 6 is a view of the core metal as viewed from a crawler outer circumference side.

As illustrated in FIG. 5, the pair of roller disengagement preventing protrusions 24A and 24B protrudes to have an appropriate vertical width at the same height position as the substantially flat crawler outer circumference side surfaces 21*cd* and 21*cd* of the core metal blade parts 21*c* and 21*c* on opposite sides.

The same applies to the pair of roller disengagement preventing protrusions 23A and 23B.

The roller disengagement preventing protrusions 23A, 23B, 24A, and 24B protrude tapered when viewed in the crawler thickness direction.

The roller disengagement preventing protrusion 23A and the roller disengagement preventing protrusion 24A protrude from one guide protrusion base 21*b* in directions opposite to each other, and the roller disengagement preventing protrusion 23B and the roller disengagement preventing protrusion 24A protrude from the other guide protrusion base 21*b* in directions opposite to each other.

With reference to FIG. 4, the paired roller disengagement preventing protrusions 23A and 23B protruding in one direction of the crawler circumferential direction have different protrusion lengths, and the roller disengagement preventing protrusion 23B has a longer protrusion length than the roller disengagement preventing protrusion 23A by a protrusion length difference D1.

Similarly, the pair of roller disengagement preventing protrusions 24A and 24B protruding in the other direction of the crawler circumferential direction have different protrusion lengths, and the roller disengagement preventing protrusion 24A has a longer protrusion length than the roller disengagement preventing protrusion 23B by a protrusion length difference D2.

A width W1 between protruding ends of the pair of roller disengagement preventing protrusions 23A and 23B protruding in one direction of the crawler circumferential direction is narrower than a width W2 between protruding ends of the pair of roller disengagement preventing protrusions 24A and 24B protruding in the other direction of the crawler circumferential direction.

Ribs 25 and 25 respectively connect the pair of roller disengagement preventing protrusions 24A and 24B having the large width W2 between the protruding ends and the core metal blade parts 21*c* and 21*c* extending laterally from the roller disengagement preventing protrusions 24A and 24B.

With reference to FIG. 5, crawler outer circumference side surfaces 25*d* and 25*d* of the ribs 25 and 25 are located on the crawler inner circumference side of the crawler outer circumference side surfaces 21*cd* and 21*cd* of the core metal blade parts 21*c* and 21*c*.

The crawler outer circumference side surfaces 25*d* and 25*d* of the ribs 25 and 25 may be located at the same position in the crawler circumferential direction as the crawler outer circumference side surfaces 21*cd* and 21*cd* of the core metal blade parts 21*c* and 21*c*.

When viewed from the crawler thickness direction, the ribs 25 and 25 are formed, in a triangular shape so as to expand areas of the roller disengagement preventing protrusions 24A and 24B, at corners formed by the roller disengagement preventing protrusions 24A and 24B and the core metal blade parts 21*c* and 21*c*.

The ribs 25 and 25 viewed from the crawler thickness direction are not limited to a triangular shape, but may be developed into a rectangular shape or a shape such as a quadrangular circle.

Further, crawler inner circumference side surfaces 25*u* and 25*u* on the crawler inner circumference side of the ribs 25 and 25 gradually rise from the sides toward the guide protrusions 22 and 22.

The core metals 20 as described above are embedded in the plural in the endless belt-shaped rubber body 11 at constant intervals in the crawler circumferential direction.

Figure 8:
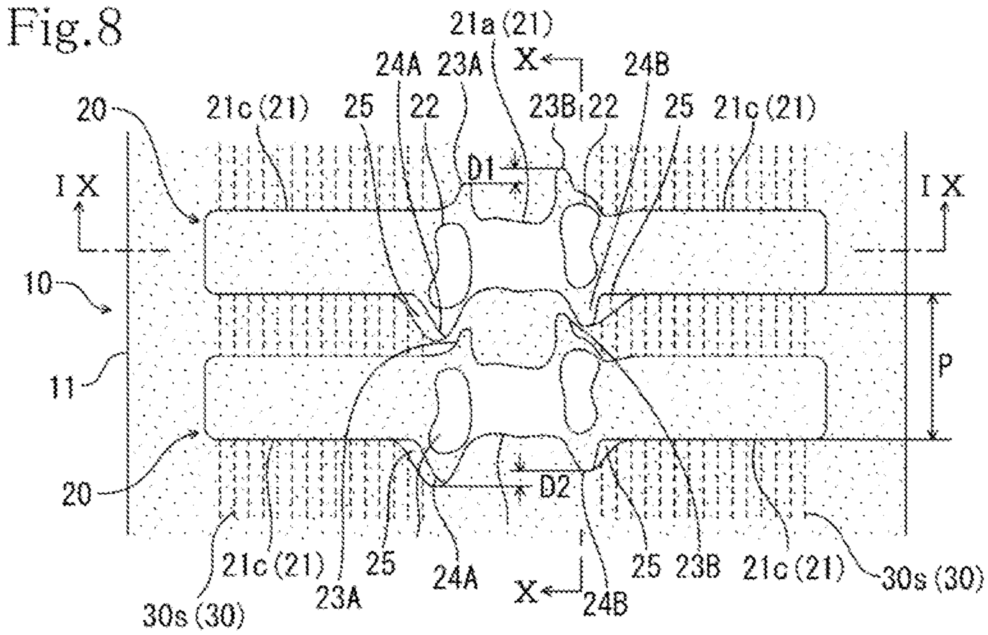
FIG. 8 is a partial view of the elastic crawler with core metals as viewed from the crawler inner circumference side.

FIG. 8 is a partial view of the elastic crawler 10 with core metals as viewed from the crawler inner circumference side, and shows two adjacent core metals 20 and 20, and shows the endless belt-shaped rubber body 11 with a dotted pattern.

The core metals 20 are embedded in the endless belt-shaped rubber body 11 at an embedding pitch P.

The roller disengagement preventing protrusions 23A and 23B having the width W1 between the pair of protruding ends protruding in one direction of the crawler circumferential direction from the core metal main body 21 of one core metal 20 are arranged so as to be sandwiched, from the outside in the crawler width direction, by the roller disengagement preventing protrusions 24A and 24B having the width W2 (>W1) between the pair of protruding ends protruding in the other direction of the crawler circumferential direction from the core metal main body 21 of the adjacent core metal 20.

Therefore, the roller disengagement preventing protrusion 23A and the roller disengagement preventing protrusion 24A, and the roller disengagement preventing protrusion 23B and the roller disengagement preventing protrusion 24B which protrude to each other toward the respective opposed core metal main bodies 21 of the adjacent core metals 20 mesh each other in the crawler width direction.

As a result, lateral displacement in the crawler width direction is suppressed between the adjacent core metals 20 and 20.

The protrusion length difference D1 between the pair of roller disengagement preventing protrusions 23A and 23B protruding in one direction of the crawler circumferential direction from the guide protrusion bases 21*b* and 21*b* of the core metal main body 21, and the protrusion length difference D2 between the pair of roller disengagement preventing protrusions 24A and 24B protruding in the other direction of the crawler circumferential direction are 15% or less of the embedding pitch P of the core metal 20.

The core metals 20 are embedded in the endless belt-shaped rubber body 11 except for the pair of guide protrusions 22 and 22 and the crawler inner circumference side surface 21*au* of the central engagement portion 21*a*.

Specifically, the core metal main body 21 excluding an upper part of the central engagement portion 21*a*, the roller disengagement preventing protrusions 23A, 23B, 24A, and 24B, and the ribs 25 and 25 are buried in the endless belt-shaped rubber body 11.

Since the roller disengagement preventing protrusions 23A, 23B, 24A, and 24B and the ribs 25 and 25 are buried in the endless belt-shaped rubber body 11, rotation of the guide protrusion 22 is suppressed to some extent by the endless belt-shaped rubber body 11 via the guide protrusion base 21*b*.

Figure 9:
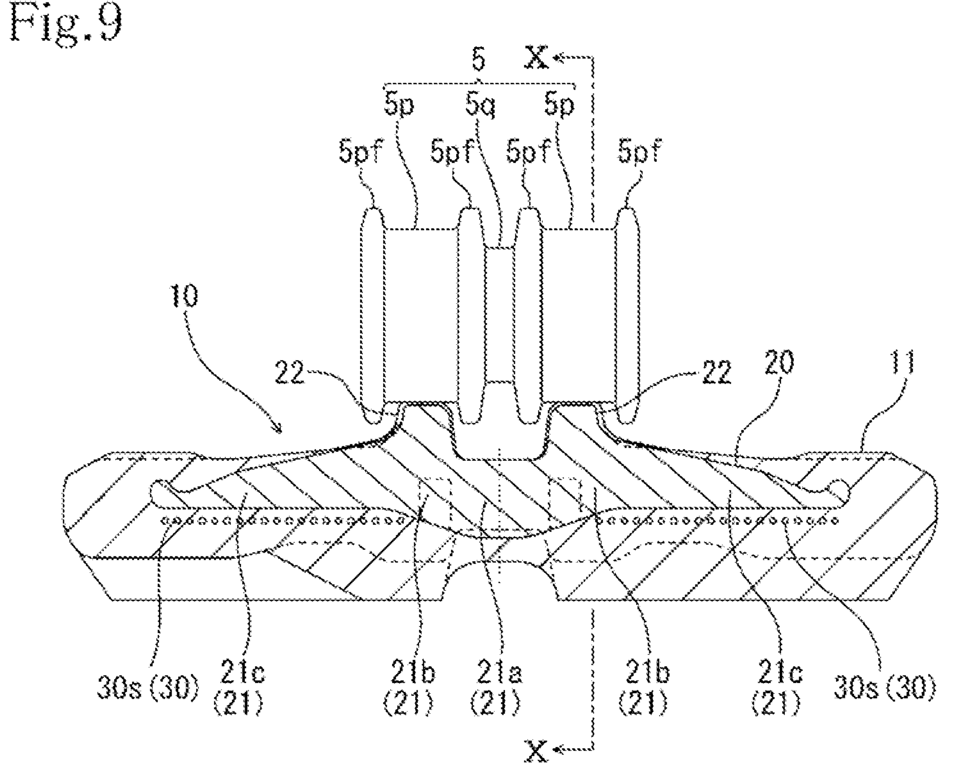
FIG. 9 is a view showing a cross section of the elastic crawler with core metals viewed from an arrow IX-IX in FIG. 8, and rollers.
Figure 10:
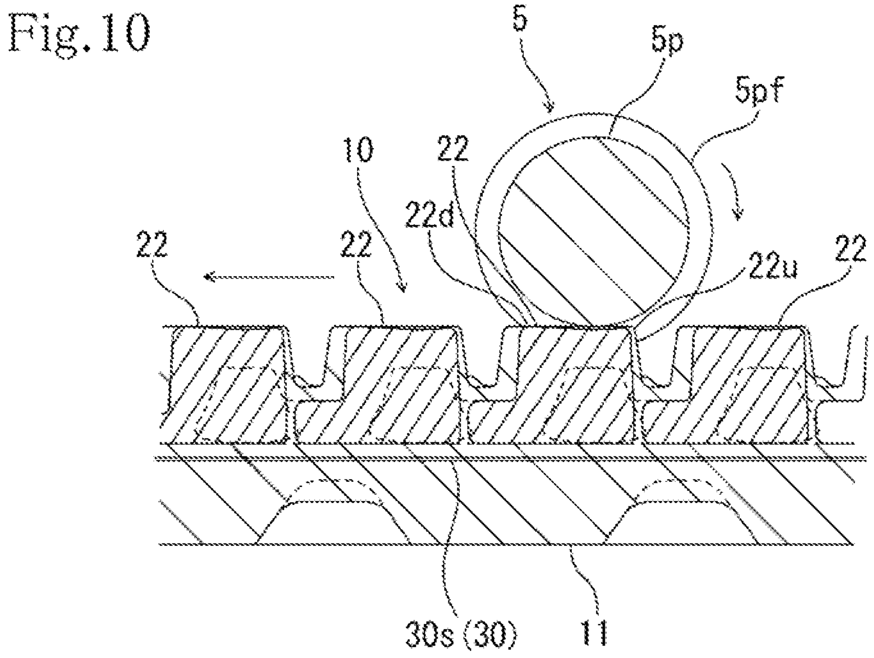
FIG. 10 is a cross-sectional view of the elastic crawler with core metals and the rollers viewed from an arrow X-X in FIGS. 8 and 9.

Then, steel cord layers 30 in which a plurality of steel cords 30*s* extending in the crawler circumferential direction are arranged are disposed along the crawler outer circumference side surfaces 21*cd* and 21*cd* of the core metal blade parts 21*c* and 21*c* on opposite sides of the core metal main body 21 in the vicinity of the crawler outer circumference side surfaces 21*cd* and 21*cd*, respectively, and are embedded in the endless belt-shaped rubber body 11 (See FIGS. 8, 9, and 10).

As illustrated in FIG. 8, the steel cord layer 30 is disposed on the crawler outer circumference side of the core metal blade part 21*c* over substantially the entire length in the crawler width direction of the core metal blade part 21*c*, and thus, the ribs 25 connecting the roller disengagement preventing protrusions 24A and 24B and the core metal blade parts 21*c* and 21*c* sit on the steel cord layers 30 in the crawler thickness direction.

The present elastic crawler 10 with core metals has a configuration in which the rollers 5 attached to the frame 7 of the vehicle roll on the top surfaces 22*f* and 22*f* of the pair of guide protrusions 22 and 22 protruding from the endless belt-shaped rubber body 11 to the crawler inner circumference side.

With reference to FIGS. 2, 9, and 10, the roller 5 has an integral structure in which a pair of flanged wheel bodies 5*p* and 5*p* having the same shape are coaxially connected by a connecting wheel body 5*q*.

The flanged wheel body 5*p* includes flanges 5*pf* and 5*pf* at opposite ends.

As shown in FIG. 9, the pair of flanged wheel bodies 5*p* and 5*p* roll on the top surfaces 22*f* and 22*f* of the pair of guide protrusions 22 and 22, respectively.

With reference to FIG. 10, assuming that the crawler rotation direction is a direction indicated by an arrow, the roller 5 rolls on the top surface 22*f* of the guide protrusion 22 of the core metal 20 from a downstream side end portion 22*d* to an upstream side end portion 22*u* via the center in the crawler rotation direction of the guide protrusion 22.

When the roller 5 is located at the downstream side end portion 22*d*, a pressing force is applied to the downstream side end portion 22*d* of the guide protrusion 22 to push down the downstream side end portion 22*d*. When the roller 5 reaches the upstream side end portion 22*u* via the center of the guide protrusion 22. A pressing force is applied to the upstream side end portion 22*u* of the guide protrusion 22 to push down the upstream side end portion 22*u*, so that a force that causes the top portion 22*t* of the guide protrusion 22 to fluctuate in the crawler circumferential direction is applied.

On the other hand, the core metal blade part 21*c* of the core metal 20 presses the endless belt-shaped rubber body 11 in which the steel cord layer 30 of the elastic crawler 10 with core metals is embedded against the ground, and is thus maintained substantially parallel to the ground.

Therefore, a force causing torsional rotation acts on the guide protrusion 22 with respect to the core metal blade part 21*c*.

Torsional rotation of the guide protrusion 22 with respect to the core metal blade part 21*c* causes the rollers 5 to move up and down to generate vibration.

Since in the elastic crawler 10 with core metals of the present embodiment, the ribs 25 and 25 connect the roller disengagement preventing protrusions 24A and 24B protruding in the crawler circumferential direction from the guide protrusion bases 21*b* and 21*b* of the core metal main body 21 and the core metal blade parts 21*c* and 21*c*, the torsional rigidity of the guide protrusions 22 and 22 formed on the guide protrusion bases 21*b* and 21*b* with respect to the core metal blade parts 21*c* and 21*c* is structurally enhanced, and the areas of the roller disengagement preventing protrusions 24A and 24B embedded in the endless belt-shaped rubber body 11 when viewed from the crawler thickness direction are expanded by the ribs 25 and 25, so that the rotation of the roller disengagement preventing protrusions 24A and 24B and the guide protrusions 22 and 22 by the endless belt-shaped rubber body 11 is further suppressed. Therefore, even when the rollers 5 roll on the top surfaces 22*f* and 22*f* of the guide protrusions 22 and 22, torsional rotation of the guide protrusions 22 and 22 is suppressed with respect to the core metal blade parts 21*c* and 21*c* of the core metal 20 which are kept substantially parallel to the ground by pressing of the endless belt-shaped rubber body 11 together with the steel cord layer 30 against the ground, and thus, it is possible to reduce the vertical movement of the roller 5 and make the vibration more difficult to occur, thereby preventing deterioration of the traveling vibration of a bodywork.

Figure 7:
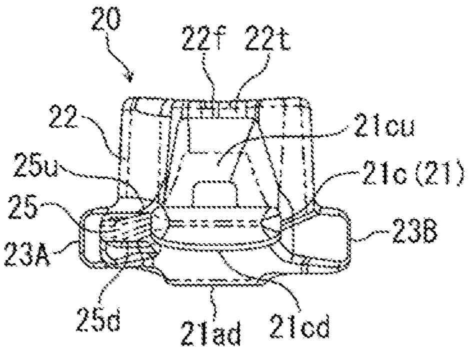
FIG. 7 is a side view of the core metal.

As shown in FIGS. 5 and 7, since the crawler outer circumference side surface 25*d* of the rib 25 is located on the crawler inner circumference side of the crawler outer circumference side surface 21*cd* of the core metal blade part 21*c*, the rib 25 is located closer to the top portion 22*t* of the guide protrusion 22, and a rotation center of the guide protrusion 22 with respect to the core metal blade part 21*c* comes to the crawler inner circumference side, whereby the torsional rigidity of the guide protrusion with respect to the core metal blade part is enhanced. As a result, the rotation of the guide protrusion 22 is suppressed to make the vertical movement of the roller 5 further smaller, thereby making the vibration more difficult to occur.

Note that the crawler outer circumference side surfaces 25*d* of the rib 25 may be located at the same position in the crawler circumferential direction as the crawler outer circumference side surface 21*cd* of the core metal blade part 21*c*.

As shown in FIG. 5, since the crawler inner circumference side surface 25*u* of the rib 25 is raised toward the crawler inner circumference side, the rotation center of the guide protrusion 22 with respect to the core metal blade part 21*c* comes to the crawler inner circumference side, whereby the torsional rigidity of the guide protrusion 22 with respect to the core metal blade part 21*c* is enhanced. As a result, the rotation of the guide protrusion 22 is suppressed to make the vertical movement of the roller 5 further smaller, thereby making the vibration more difficult to occur.

As shown in FIG. 8, since the rib 25 sits on the steel cord layer 30 embedded on the crawler outer circumference side of the core metal blade part 21*c* of the endless belt-shaped rubber body 11 in the crawler thickness direction, the rib 25, together with the core metal blade part 21*c*, is supported by the steel cord layer 30 via rubber which is an elastic material.

Since the rib 25 connects the core metal blade part 21*c* and the roller disengagement preventing protrusions 24A and 24B, together with the rib 25, the guide protrusion 22 is supported by the steel cord layer 30 via the roller disengagement preventing protrusions 24A and 24B and further the guide protrusion base 21*b*, so that the rotation of the guide protrusion 22 is further suppressed.

Therefore, the vertical movement of the rollers 5 can be further reduced to make the vibration more difficult to occur.

With reference to FIG. 8, since the paired roller disengagement preventing protrusions 23A and 23B (24A, 24B) respectively protruding from the pair of guide protrusion bases 21*b* and 21*b* in one direction of the crawler circumferential direction have different protrusion lengths, the protrusion length of one roller disengagement preventing protrusion 23B (24A) of the pair of roller disengagement preventing protrusions 23A and 23B (24A, 24B) can be increased as compared with a case where the protrusion lengths are the same, whereby resistance to the rotation of the guide protrusion 22 increases to suppress the rotation of the guide protrusion 22, resulting in further reducing the vertical movement of the roller 5 to make the vibration more difficult to occur.

When the difference between the protrusion lengths of the pair of roller disengagement preventing protrusions 23A and 23B (24A, 24B) is large, the resistances of the pair of roller disengagement preventing protrusions 23A and 23B (24A, 24B) to the rotation of the pair of guide protrusions 22 and 22 greatly differ, and thus the central engagement portion 21*c* between the pair of guide protrusions 22 and 22 is twisted, so that the pair of guide protrusions 22 and 22 may rotate in opposite directions to each other, which may cause the vertical movement of the roller 5.

With reference to FIG. 8, in the present embodiment, by setting the difference D1, D2 between the protrusion lengths of the pair of roller disengagement preventing protrusions 23A, 23B (24A, 24B) to 15% or less of the embedding pitch P of the core metal 20, it is possible to suppress the rotation of the pair of guide protrusions 22, 22 in opposite directions as much as possible while increasing the resistance to the rotation of the guide protrusion by the roller disengagement preventing protrusion 23B (24A) having the larger protrusion length as compared with the case where the protrusion lengths are the same, to further reduce the vertical movement of the roller 5, resulting in making vibration more difficult to occur.

Although the elastic crawler with core metals according to one embodiment of the present invention has been described in the foregoing, modes of the present invention are not limited to the above embodiment, and include those implemented in various modes within the scope of the gist of the present invention.

Although in the crawler traveling device 1 according to the present embodiment, the elastic crawler 10 with core metals is wound around the driving sprocket 2 and one driven sprocket 3, the structure may change with the configuration of the crawler traveling device, and the elastic crawler with core metals can be wound around the driving sprocket and a plurality of the driven sprockets.

SDGs have been proposed to realize a sustainable society.

The one embodiment of the present invention is considered to be a technology that contributes to long-term use of an elastic crawler and the like by suppressing vibration of a crawler traveling device to suppress damage to the elastic crawler and a bodywork and improve durability.

REFERENCE SIGNS LIST

1 crawler traveling device
2 driving sprocket
2*c* rotation shaft
2*p* pin
3 driven sprocket
5 roller
7 frame
10 elastic crawler with core metals
11 endless belt-shaped rubber body
12 lug
20 core metal
21 core metal main body
21*a* central engagement portion
21*b* guide protrusion base
21*c* core metal blade part
22 guide protrusion
22*t* top portion
22*f* top surface
23A, 23B, 24A, 24B roller disengagement preventing protrusion
30 steel cord layer
30*s* steel cord

The invention claimed is:

1. A construction vehicle including a crawler traveling device including a driving sprocket, rollers, and an elastic crawler (10) with core metals (20) embedded in an endless belt-shaped elastic body (11) made of an elastic material at constant intervals in a crawler circumferential direction, the elastic crawler with core metals having a configuration in which a core metal main body (21) elongated in a crawler width direction of the core metal (20) includes a central engagement portion (21*a*) with which a driving sprocket (2) is engaged, a pair of guide protrusion bases (21*b*) formed at opposite ends of the central engagement portion (21*a*), and a pair of core metal blade parts (21*c*) extending laterally to opposite sides to each other from the pair of guide protrusion bases (21*b*), a pair of guide protrusions (22) protrudes from the pair of guide protrusion bases (21*b*) to a crawler inner circumference side, the core metal (20) is embedded in the endless belt-shaped elastic body (11) except for at least the guide protrusions (22), and rollers (5) arranged along a longitudinal direction of the elastic crawler and roll on a top of the guide protrusion (22), wherein the elastic crawler (10) comprises:

roller disengagement preventing protrusions (23A, 23B; 24A, 24B) respectively protruding in opposite directions of the crawler circumferential direction from each of the pair of guide protrusion bases (21*b*, 21*b*) of the core metal main body (21), each of the roller disengagement preventing protrusions (23A, 24A; 23B, 24B) meshing with the corresponding roller disengagement preventing protrusions of the adjacent core metal in the crawler width direction; and ribs (25, 25) connecting each of the roller disengagement preventing protrusions (24A, 24B) located at the side of the core metal blade parts (21*c*, 21*c*) with the corresponding core metal blade part (21*c*, 21*c*).

2. The construction vehicle including the crawler traveling device including the driving sprocket, rollers and the elastic crawler (10) with the core metals according to claim 1, wherein each of the ribs (25) has a crawler outer circumference side surface (25*d*) located at the same position as a crawler outer circumference side surface (21*cd*) of the corresponding core metal blade part (21*c*), or each of the ribs (25) has a crawler outer circumference side surface (25*d*) located at the inner position of the crawler circumferential direction relative to the corresponding crawler outer circumference side surface (21*cd*).

3. The construction vehicle including the crawler traveling device including the driving sprocket, rollers and the elastic crawler (10) with the core metals according to claim 1, wherein the rib (25) is raised toward the crawler inner circumference side.

4. The construction vehicle including the crawler traveling device including the driving sprocket, rollers and the elastic crawler (10) with the core metals according to claim 1, wherein the rib (25) sits on a radially inward side of a steel cord layer (30) embedded on a crawler outer circumference side of the core metal blade part (21*c*) of the endless belt-shaped elastic body (11) in a crawler thickness direction.

5. The construction vehicle including the crawler traveling device including the driving sprocket, rollers and the elastic crawler (10) with the core metals according to any one of claims 1 to 4, wherein the paired roller disengagement preventing protrusions (23A, 24A; 23B, 24B) protruding respectively from the pair of guide protrusion bases (21*b*, 21*b*) in opposite directions of the crawler circumferential direction have protrusion lengths different from each other.

6. The construction vehicle including the crawler traveling device including the driving sprocket, rollers and the elastic crawler (10) with the core metals according to claim 5, wherein a difference (D1, D2) between the protrusion lengths of the pair of roller disengagement preventing protrusions (23A, 24A; 23B, 24B) is 15% or less of an embedding pitch (P) of the core metal.

* * * * *